United States Patent
Biedermann et al.

(10) Patent No.: US 6,551,702 B1
(45) Date of Patent: Apr. 22, 2003

(54) MELAMINE RESIN DISPERSIONS

(75) Inventors: Norbert Biedermann, Freinsheim (DE); Günter Scherr, Ludwigshafen (DE); Christof Jäckh, Heidelberg (DE); Jakob Decher, Bobenheim-Roxheim (DE); Valerie Andre, Worms (DE); Werner Schnurr, Herxheim am Berg (DE); Ingolf Hennig, Neulussheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 77 days.

(21) Appl. No.: 09/695,995

(22) Filed: Oct. 26, 2000

(30) Foreign Application Priority Data

Nov. 11, 1999 (DE) .......................... 199 54 189

(51) Int. Cl.$^7$ ................................ B32B 5/16
(52) U.S. Cl. ...................... 428/323; 428/327; 428/524; 428/526; 428/532; 428/537.5; 528/232; 525/398
(58) Field of Search ................. 428/524, 526, 428/532, 327, 537.5, 323; 528/232; 525/398

(56) References Cited

U.S. PATENT DOCUMENTS

| | | | |
|---|---|---|---|
| 3,428,607 A | 2/1969 | Renner | 528/232 |
| 4,767,807 A | 8/1988 | Fujikawa et al. | 524/36 |
| 5,162,486 A | 11/1992 | Follmann et al. | 528/232 |
| 5,344,704 A | 9/1994 | O'Dell et al. | 428/323 |

FOREIGN PATENT DOCUMENTS

| | | | |
|---|---|---|---|
| DE | 224 602 | | 7/1985 |
| DE | A 3 628 244 | | 2/1987 |
| DE | 248 803 | | 8/1987 |
| DE | 37 41 282 | | 6/1989 |
| EP | 0 363 752 | | 4/1990 |
| EP | 0 443 428 | | 8/1991 |
| EP | 0 415 273 | | 11/1994 |
| EP | 0 693 030 | | 1/1996 |
| EP | 0 733 686 | | 9/1996 |
| JP | 62-068811 | * | 3/1987 |
| JP | 11-021355 | | 7/1997 |
| SU | 441-272 | * | 7/1972 |
| WO | WO 97/07152 | | 2/1997 |
| WO | WO 99/39052 | | 8/1999 |

* cited by examiner

Primary Examiner—Leszek Kiliman
(74) Attorney, Agent, or Firm—Oblon, Spivak, McClelland, Maier & Neustadt, P.C.

(57) ABSTRACT

Aqueous melamine resin dispersions comprise as discontinuous phase a melamine resin stabilized with a combination of a cationic protective colloid and an anionic protective colloid.

18 Claims, No Drawings

MELAMINE RESIN DISPERSIONS

The present invention relates to aqueous melamine resin dispersions comprising as discontinuous phase a melamine resin stabilized by a combination of a cationic protective colloid and an anionic protective colloid.

The invention further relates to formulations comprising these dispersions, to decorative sheets coated with these formulations, to woodbase materials coated with these decorative sheets, and to processes for preparing or producing the melamine resin dispersions, decorative sheets and coated woodbase materials.

Melamine resin solutions comprising melamine and formaldehyde are general knowledge from, for example, Kunststoff Handbuch, 2nd Edition 1988, Volume 10, pp. 41 to 49.

From these solutions it is common, by impregnating and coating paper, to produce melamine resin sheets which are used inter alia for coating woodbase materials in the furniture industry.

The processing industry and the end users impose various requirements on the melamine resins and the products produced from them regarding the processing properties and end properties of the melamine resins and products produced from them.

According to the prior art, a sheet of a decorative paper is impregnated with a melamine resin condensate in a one- or two-stage process, dried and subsequently laminated under pressure and with heating onto a support plate. In the one-stage process, the resin filling the paper and the resin forming the sealing surface are identical. In the two-stage impregnating process, the decorative paper is first filled with 50–100% of solid resin (based on the paper weight) and, directly or after initial drying, further resin is applied to the top and/or bottom of the paper sheet by dipping, knife coating or brushing. This makes it possible to use different grades of impregnating resin in the two impregnating stages. The paper sheet is preferably filled using relatively inexpensive urea-formaldehyde impregnating resins or mixtures of urea-formaldehyde and melamine-formaldehyde impregnating resins. The top layer, which is critical to the properties of the product, consists preferably of pure melamine resin.

As far as the processability of the melamine resins is concerned, a particular desire is that the melamine resins are readily dilutable in water even after prolonged storage; in other words, on dilution with water they should not form any tacky coagulum. Good dilutability in water is important because this property is a precondition for easy cleaning of transportation vessels and processing machines. Further, it is desired that the melamine resins do not form a skin during the drying of the impregnated paper sheet. Premature filming of the resin surface, or formation of a skin, is disadvantageous since it hinders the subsequent drying process and reduces the rate of drying, whereas the processor is particularly interested in very rapid drying and thus high productivity.

As far as the service properties of the sheets produced with the melamine resins is concerned, these sheets are intended to possess a certain degree of elasticity so that they can also be used to coat structured and profiled surfaces of woodbase material parts without cracking in the pressed-on sheets. Furthermore, the elasticity should be sufficient to ensure that swelling and shrinkage in the woodbase material, as may occur, for example, with a change in the ambient climate, again do not result in surface cracking. In addition to cracking resistance of this kind, the pressed-on melamine resin sheets should in addition be insensitive to humidity and, in particular, to water vapor.

Moreover, the surface coatings are intended to impart an impression of color which is as brilliant as possible. This is often countered, however, by the fact that the resins used to impregnate the decorative papers gray on curing and tend to develop white efflorescence, and thus attenuate the color effect of color-printed or colored decorative papers. This phenomenon occurs particularly with black decorative papers, which then in many cases no longer have the desired "blackness".

A further requirement made by furniture producers is that the impregnated products produced with the melamine resins form high-gloss surfaces when pressed onto furniture parts.

The melamine resin solutions known from the prior art are generally already well able to meet this profile of requirements. However, as far as their water dilutability following storage is concerned, these resin solutions appear to be still in need of improvement. It is also regarded as disadvantageous that following application to the decorative paper which is to be coated the resin solutions form films prematurely, which may impair the drying process by forming bubbles or dust and/or may lead to reduced machine speeds and defects in the sheet surfaces.

Also known from the prior art are aqueous dispersions of melamine resins which are already in a fully or partly cured state.

A similar process for preparing benzoguanamine-melamine-formaldehyde particles is described in U.S. Pat No. 3,945,980. The amino resin precondensate there is diluted until its water compatibility limit is exceeded, with the addition of polyvinyl alcohol, and is cured by means of heat and acidity.

Moreover, the preparation of melamine resin particles is described in European Patents EP 0 415 273 and EP 0 363 752. The starting material used in this case is a methanol-etherified melamine resin which is crosslinked by means of acidity and heat in the presence of a sulfonic acid polymer at concentrations of about 7%. These melamine resins are in practice unsuitable for producing decorative sheets since in the course of the production of the sheets or of the coated woodbase materials they give off methanol, which is unacceptable from the industrial hygiene standpoint.

Processes similar to the above are described in DD 224 602, JP 11021355, SU 441 272, JP 62068811, DD 248803 and DE 3 628 244. The products in all cases are fully cured, unmeltable and insoluble thermoset powders with a wide variety of particle sizes, which are recommended for use as calibration material, pigment, rheology modifier, filler, flame retardant, and flatting agent. The space-time yields are unsatisfactory in every case and the particle sizes, owing to the use of the protective colloid systems described, are in some cases severely scattered.

The preparation of melamine resin particles is known, furthermore, from U.S. Pat. No. 3,428,607. The preparation is described of cured melamine resin particles by stirring a M/F precondensate into an aqueous solution of protective colloids such as carboxymethylcellulose, gelatine, agar-agar, starch or alginates at melamine resin concentrations of 0.01%–10% and carrying out reaction at a pH of 6–8 and at the boiling temperature of the solvent.

U.S. Pat. No. 5,344,704 discloses aqueous mixtures containing precured melamine resin particles and an additional binder (e.g., sodium alginate or microcrystalline cellulose). Decorative papers are impregnated or coated with this mixture, dried, impregnated with melamine resin solutions and then cured to produce sheets used for surface coating. Said mixtures are prepared by fully or partly curing a melamine resin and subsequently grinding it to an average particle size of about 50 μm and dispersing it together with a protective colloid in water or a melamine resin solution. A particular disadvantage of this process is that the dispersions coagulate rapidly owing to the size of the resin particles. Furthermore, the grinding of the partly cured resin is technically complex.

WO 97/07152 describes a process for preparing aqueous dispersions containing fully or partly cured melamine resins. For this purpose an aqueous melamine resin solution is admixed with an aqueous suspension of a water-insoluble protective colloid, such as microcrystalline cellulose, the melamine resin precipitating as a result of exceeding its solubility limit, and forming a stable dispersion. This mixture is subsequently reacted further, if desired, so that the melamine resin attains the desired degree of cure. The melamine resin particles obtained in this way have an average size of from less than 1 μm to 700 μm. It is noted, furthermore, that soaps and customary water-soluble protective colloids are unsuited to the preparation of appropriate melamine resin particles since in the case of soaps, this leads to technical problems in connection with the preparation of the melamine resin dispersions and in the case of protective colloids leads to fine dispersions of nonuniform size. The melamine resin dispersions stabilized with water-insoluble protective colloids such as microcrystalline cellulose, on the other hand, have the disadvantage that they can be prepared only with low solids contents of less than 40%, since above a concentration of only 3% the microcrystalline cellulose used leads to the formation of a thixotropic gel. At concentrations of more than 40%, based on the sum of melamine and formaldehyde, microcrystalline cellulose can no longer be used to prepare a fine dispersion having particle sizes of less than 30 μm. Moreover, microcrystalline cellulose is known to be a relatively expensive ingredient.

It is an object of the present invention to provide melamine resin dispersions which do not have the disadvantages of the prior art and which in particular permit the production of sheets having superior surface properties such as luster and coherency.

We have found that this object is achieved by the initially defined melamine resin dispersions, formulations, decorative sheets and woodbase materials, and by processes for preparing and producing them.

The melamine resin dispersions of the invention are generally prepared from
  a) melamine
  b) from 1.3 to 3.0 mol of formaldehyde per mole of melamine,
  c) if desired, up to 0.5 mol of urea per mole of melamine, and
  d) if desired, from 0.01 to 0.3 mole of another compound capable of reacting with formaldehyde in a polycondensation reaction, per mole of melamine.

The melamine (component a) is normally used in solid form.

The formaldehyde (component b) is used preferably in the form of an aqueous solution with a strength of from 30 to 50% by weight or in the form of paraformaldehyde.

The urea (component c) is employed likewise in solid form, in the form of an aqueous solution or in the form of a precondensate with the formaldehyde.

Suitable components (d) are primarily those used, if desired, together with formaldehyde in the preparation of amino resins (cf. Ullmanns Encyklopädie der technischen Chemie, 4th Edition, Volume 7, pp. 403 to 422), i.e., for example, dicyandiamide and guanamines such as benzoguanamine and acetoguanamine. Bisguanamines such as adipo-, glutaro- or methylolglutarobisguanamine, and compounds containing two or more rings, e.g. fused aminotriazine rings, are likewise suitable.

Ingredients suitable for use as elasticizers (component e) are the following:
  mono- or polyhydric alcohols, e.g., tert-butanol, ethylene glycol, diethylene glycol, triethylene glycol, polyethylene glycols, butanediols, pentanediols, hexanediols, trimethylolpropane, neopentyl glycol and sorbitol
  amino alcohols, e.g., ethanolamine, diethanolamine and triethanolamine,
  amides and lactams, e.g., formamide, methylformamide, dimethylformamide, urea, methyl ureas, cyclic ureas, thio urea, polyureas, $C_3$ to $C_9$ lactams
  ethanolamides, e.g., formic acid ethanolamide, acetic acid ethanolamide, and trishydroxyethyl isocyanurate-hydroxyethylurea,
  the abovementioned compounds in ethoxylated form, said compounds carrying on average preferably from 1 to 20 ethylene oxide units, including in particular ethoxylated caprolactam, ethoxylated oligo- or polycaprolactam having on average from 1 to 10 ethylene oxide units per caprolactam unit, and also ethoxylated melamine,
  2-(5-hydroxy-3-oxapentylamine)-1,3,5-triazine, 2,4-di(5-hydroxy-3-oxapentylamine)-1,3,5-triazine, 2,4,6-tris(5-hydroxy-3-oxapentylamine)-1,3,5-triazine (THOM) or mixtures of these compounds (HOM), and
  further, the elasticizers specified in EP-A-800 543.

Particularly suitable cationic protective colloids are cationic starch, quaternized polyvinylimidazole and/or its copolymers with, for example, vinylpyrrolidone; quaternized polyethyleneimines and polyvinylamines.

The anionic protective colloid is preferably a copolymer of acrylic acid, methyl acrylate and 2-acrylamido-2-methylpropanesulfonic acid. Further suitable compounds are the following: sodium polyacrylate, sodium polymaleate, the sodium salts of copolymers of acrylic and maleic acid, phenolsulfonic acid-formaldehyde condensates, naphthalenesulfonic acid-formaldehyde condensates, and anionic starches.

The anionic and the cationic protective colloid are normally used in an overall amount of from 0.02 to 6% by weight, preferably from 0.5 to 3% by weight, based on the overall amount of melamine and formaldehyde used to prepare the melamine resin. The weight ratio of anionic to cationic protective colloid is usually from 0.02:1 to 50:1, preferably from 0.1:1 to 10:1.

The melamine resin dispersions are generally prepared by the following procedure:
  1. in step 1, first preparing an aqueous solution of a melamine resin from components a) to d) in the presence or absence of the anionic and of the cationic protective colloid and continuing reaction at a pH of from 7 to 10, preferably from 7.2 to 9 and at a temperature of from 50 to 140° C., preferably from 90 to 120° C., with particular preference from 60 to 100° C., until cloudiness begins, t he anioni c and cationic protective colloids being added no later than at th e o nset of clouding;
  and
  2. further reacting the melamine resin solution prepared in accordance with step 1 at a pH of from 7 to 10, preferably from 7.2 to 9 and at a temperature of from 50 to 140° C. until it has undergone transition to a dispersion.

The pH is generally established using Brönsted alkalis or acids, or buffer substances such as diethylethanolamine, for example.

The reaction can in principle take place in accordance with the same methods and in the same apparatus as the preparation of the melamine resin solutions known in general.

The formation of a disperse phase can be monitored very simply by visual assessment (onset of clouding) or very much more precisely by means of on-line turbidity measurement, up to a defined turbidity value, by means of a fiber-optical diffuse-light probe.

The mixing of the reaction mixture formed in step 1 with the protective colloids is not critical; the use of special stirring elements exerting a high shear action is not required.

Since the melamine resin dissolved initially has undergone transition to a dispersion, the reaction is ended by cooling to normal temperature and a pH of from 9 to 10 is established.

The melamine resin present in dispersed form in the melamine resin dispersions generally has a glass transition temperature of from 0 to 80° C., preferably from 20 to 60° C. and an energy content of from 20 to 160 J/g (calculated on the basis of a 100% dispersion).

The glass transition temperature and the energy content can be determined in a simple manner by means of DSC measurements (DSC: differential scanning calorimetry).

When the desired energy content and glass transition temperature have been reached can be determined by means of a simple preliminary experiment in which a sample is taken every 5 minutes, approximately, in step 2 and is analyzed by DSC for its energy content and its glass transition temperature.

The elasticizers can in principle be added at any phase of the preparation or subsequent thereto. In the case of the alcohols and urea derivatives they are preferably added at the beginning of the reaction; in the case of the amides they are preferably added at a later point in time. The time of addition and the reaction regime determine the incorporation of the elasticizers into the resin matrix and influence the product properties via the resulting difference in distribution in the dispersion phase or in the continuous phase.

As far as the reasons for the turbidity and the action of the protective colloid are concerned, the following is presumed:

The formation of a disperse phase results from the increasing hydrophobicization of the amino resin component in the course of condensation. The increase in the hydrophobic nature of the amino resin component results from the formation of higher-order aggregates, without the formation of covalent bonds between methylol compounds, and/or the increase in the molecular weight as a result of the formation of covalent bonds.

The contribution made by the two mechanisms to hydrophobicization determines the properties of the dispersion. The two mechanisms can be differentiated by analyzing the products and the intermediates using quantitative $^{13}C$ NMR spectroscopy and DSC. Quantitative $^{13}C$ NMR spectroscopy can be used to determine the proportion of methylene bridges, methyl ether bridges, and methylol groups. The DSC method can be used to determine the glass transition temperature and the energy content of the dispersion and to draw conclusions regarding the degree of condensation. Particularly desirable is a high proportion of methylol groups (>40 mol % based on formaldehyde $CH_2$ groups detected) and a glass transition temperature and energy content as defined. Lower energy contents result in dispersions having inadequate properties.

The aggregation of the resin phase in the course of its deposition is prevented by the protective colloids used. The cationic protective colloid occupies the interface formed and initially stabilizes the dispersion. The anionic protective colloid then in turn occupies the cationic interface, leading to charge reversal. In addition to the electrostatic stabilization which this achieves, excess anionic protective colloid contributes to stabilizing the dispersion by way of the mechanism of depletion stabilization. Without the addition of the anionic protective colloid, the dispersion thickens on storage and forms dilatant sediments. Without the cationic protective colloid, the dispersions obtained are coarse with a broad particle size distribution (0.5 $\mu$m to 500 $\mu$m).

The reaction mixture preferably contains water in amounts such that the solids content of the reaction mixture is from 40 to 70% by weight. Since this is also the preferred value for the melamine resin dispersion, it is then unnecessary to dilute it further by adding water or to concentrate it by means of distillation under reduced pressure.

The viscosity of the melamine resin dispersions prepared in this way is generally from 20 to 300 mPas (based on a dispersion having a solids content of 50%, measured at 20° C.).

The particle sizes are on average from 0.05 $\mu$m to 300 $\mu$m, preferably from 0.2 $\mu$m to 5 $\mu$m.

The melamine resin dispersions are generally employed in the form of formulations comprising the melamine resin dispersion of the invention
  if desired, from 1 to 200% by weight, based on the overall amount of formaldehyde and melamine in the form of the melamine resin, of an uncured melamine resin and/or urea resin in dissolved form
  if desired, a thickener or thixotropic agent.

Suitable melamine or urea resin solutions with which the melamine resin dispersions are used in the form of the formulations are commercially customary products as recommended for paper impregnation.

The formulations are suitable as impregnating materials, especially for producing melamine resin impregnated products. They can be used in a similar way to the normal commercial melamine resin-based products for this application sector.

Such products are prepared by impregnating papers, known as impregnation papers, e.g., decoration papers and core layer papers (sodium kraft papers), with the melamine resins. In this utility the melamine resins are employed in the form of an aqueous solution with a strength of from 40 to 70% by weight, normally with the addition of a curing agent.

Suitable curing agents are Brönsted acids such as organic sulfonic and carboxylic acids and their anhydrides, e.g., maleic acid, maleic anhydride and formic acid, ammonium compounds, e.g., ammonium sulfate, ammonium sulfite, ammonium nitrate, ethanolamine hydrochloride, and dimethylethanolammonium sulfite, and also curing agent combinations such as morpholine/p-toluene sulfonic acid.

The curing agents can be added in amounts of from 0.1 to 2.5% by weight, based on the aqueous impregnating resin. The skilled worker is aware that the amount of curing agent can be adapted to the particular performance requirements, it being possible to make corresponding adjustments to the reactivity of the impregnating resin/curing agent mixtures by way, for example, of measurement of the turbidity times and gelling times.

Auxiliaries such as wetting agents may further be added to the impregnating liquors. Examples of suitable wetting agents are ethoxylated fatty alcohols or alkylphenol ethoxylates, which can be added in amounts of from 0.2 to 0.6% by weight, based on the resin solution.

The manner in which the impregnating liquors are processed further to melamine resin impregnated products, and in which the woodbase materials are coated with these impregnated products, is known to the skilled worker.

Possible processes for the further processing of the impregnating liquors to melamine resin impregnated products composed of a plurality of superposed papers, e.g., high-pressure laminates (HPL) and continuously produced laminates (CPL), are described, for example, in DE-A-41 39 961 and DE-A 42 40 982.

The formulations of the invention can be processed either by the one-stage or by the two-stage process. In the case of the one-stage process, the resin filling the paper is present in the continuous phase of the blend, with the sealing surface being formed by the resin of the disperse phase. In the case of the two-stage impregnating process, the decoration paper is first filled with 50–100% of solid resin (based on the paper weight) and, directly or after initial drying, further resin is applied to the top and/or bottom of the paper sheet by dipping, knife coating or brushing. The paper sheet is preferably filled using relatively inexpensive urea-formaldehyde impregnating resins or mixtures of urea-formaldehyde and melamine-formaldehyde impregnating resins. The top layer, which is critical to the properties of the product, consists preferably of pure melamine resin.

The films or sheets produced in this way are normally pressed self-adhesively onto woodbase substrates under pressure and at temperatures >120° C. or else are glued on with the aid of adhesives.

The pressing of these films or sheets onto stock made of different materials such as wood, polymers, fiber composites or, in particular, woodbase materials, e.g., plywood, wood fiber board and, in particular, chipboard, gives said stock a surface which is crack-resistant, glossy and insensitive to water vapor.

One of the principal advantages of the resin dispersions of the invention is that the melamine resin is not primarily in the form of colloidal solutions and so does not have significant weaknesses of the prior art systems, such as poor storage stability, limited water dilutability, and premature filming in the course of drying.

Experimental Section
A. Preparation of the Melamine Resin Dispersions

EXAMPLE 1
(Dispersion Synthesis)

A 5 l reactor was charged with 1395 g (18.6 mol) of 40% aqueous formaldehyde, 168 g of diethylene glycol and 1293 g of water and this initial charge was adjusted to a pH of 8.8 using 25% NaOH. Following the addition of 1512 g of melamine it was heated to 100° C. In the course of heating, the melamine dissolved. As soon as a clear solution was obtained, 369 g of a 7% starch solution (Hi-Cat 21370) were added, the automatic pH control was activated, and condensation was carried out at a constant pH of 8.8 up to a turbidity point of 85° C. The pH was adjusted to 7.6 by adding 25% $HNO_3$ and at this pH and 100° C. the reaction solution was condensed further until a first turbidity appeared. Then 64.8 g of a 20% solution of Lupasol FF 4243 (copolymer of 20% acrylic acid, 20% methyl acrylate, 59% 2-acrylamido-2-methylpropanesulfonic acid and 1% styrene) in water were added, the pH was adjusted to 8.2 using 25% NaOH and the mixture was stirred at 95° C. for 3 h. Subsequently, the pH was adjusted to 9.0 and the mixture was cooled to room temperature with stirring.

The resulting MF impregnating resin dispersion had a solids content of 44%, a viscosity at 20° C. of 100 mPas, was stable to sedimentation and could be processed for at least 10 weeks.

Comparative Example 2

A 5 l reactor was charged with 1395 g (18.6 mol) of 40% aqueous formaldehyde, 168 g of diethylene glycol and 1293 g of water and this initial charge was adjusted to a pH of 8.8 using 25% NaOH. Following the addition of 1512 g of melamine it was heated to 100° C. In the course of the heating, the melamine dissolved. As soon as a clear solution was obtained the automatic pH control was activated and the mixture was condensed further at a constant pH of 8.8 up to a turbidity point of 45° C. Subsequently, the pH was adjusted to 9.0 and the mixture was cooled to room temperature with stirring.

The resulting melamine resin had a solids content of 44%, a viscosity at 20° C. of 60 and could be processed for about 5 weeks.

EXAMPLE 3

A 5 l reactor was charged with 1395 g (18.6 mol) of 40% aqueous formaldehyde, 147 g of diethylene glycol and 708 g of water and this initial charge was adjusted to a pH of 8.8 using 25% NaOH. Following the addition of 1512 g of melamine it was heated to 100° C. In the course of heating, the melamine dissolved. As soon as a clear solution was obtained, 369 g of a 7% starch solution (Hi-Cat 21370) and 64.8 g of a 20% solution of Lupasol FF 4243 in water were added, the automatic pH control was activated, and condensation was carried out at a constant pH of 8.8 up to a turbidity point of 85° C. The pH was adjusted to 7.6 by adding 25% $HNO_3$ and at this pH and 98° C. the reaction solution was condensed further until a first turbidity appeared. The pH was adjusted to 7.2 using a 25% $HNO_3$ and the mixture was stirred at 80° C. for 3 h. Subsequently, the pH was adjusted to 9.0 and the mixture was cooled to room temperature with stirring.

The resulting MF impregnating resin dispersion had a solids content of 52%, a viscosity at 20° C. of 80 mPas, was stable to sedimentation and could be processed for at least 10 weeks.

EXAMPLE 4

A 5 l reactor was charged with 1395 g (18.6 mol) of 40% aqueous formaldehyde, 168 g of diethylene glycol and 1293 g of water and this initial charge was adjusted to a pH of 8.8 using 25% NaOH. Following the addition of 1512 g of melamine it was heated to 100° C. In the course of heating, the melamine dissolved. As soon as a clear solution was obtained, 369 g of a 7% starch solution (Hi-Cat 21370) and 64.8 g of a 20% solution of Lupasol FF 4243 in water were added. At this point, the energy content of the resin solution, determined by DSC, was 170 J/g of solid resin. The automatic pH control was activated, and condensation was carried out at a constant pH of 8.8 up to a turbidity point of 50° C. The energy content was unchanged at about 170 J/g of solid resin. The pH was adjusted to 7.2 by adding 25% $HNO_3$ and the reaction solution was cooled to 70° C. After a short time, turbidity appeared. The resulting dispersion was stirred at a pH of 7.2 and at 70° C. for 4 h. After 1 h the energy content of the dispersion was 130 J/g of solid resin, after 4 h it was 83 J/g of solid resin. Subsequently, the pH was adjusted to 9.0 and the mixture was cooled to room temperature with stirring.

The resulting MF impregnating resin dispersion had a solids content of 44%, a viscosity at 20° C. of 65 mPas, was stable to sedimentation and could be processed for at least 10 weeks.

EXAMPLE 5

Comparative Example

A 5 l reactor was charged with 1216 g (16.2 mol) of 40% aqueous formaldehyde, 147 g of diethylene glycol and 1127 g of water and this initial charge was adjusted to a pH of 8.8 using 25% NaOH. Following the addition of 1318 g of melamine (10.5 mol) it was heated to 100° C. In the course of heating, the melamine dissolved. As soon as a clear solution was obtained, 322 g of a 7% starch solution (Hi-Cat 21370) and 56.5 g of a 20% solution of Lupasol FF 4243 in water were added, the automatic pH control was activated, and condensation was carried out at a constant pH of 8.8 up to a turbidity point of 85° C. The pH was adjusted to 7.6 by adding 25% $HNO_3$ and at this pH and 98° C. the reaction solution was condensed further until a first turbidity appeared. The pH was adjusted to 6.2 using 25% $HNO_3$ and the mixture was stirred at 95° C. for 6 h. Subsequently, the pH was adjusted to 9.0 and the mixture was cooled to room temperature with stirring.

The resulting MF impregnating resin dispersion had a solids content of 43%, a viscosity at 20° C. of 60 mPas, and was stable to sedimentation.

EXAMPLE 6

Comparative Example

A 5 l reactor was charged with 1479 g (19.7 mol) of 40% aqueous formaldehyde, 148 g of diethylene glycol and 982 g of water and this initial charge was adjusted to a pH of 8.8 using 25% NaOH. Following the addition of 1603 g (12.7 mol) of melamine it was heated to 100° C. In the course of heating, the melamine dissolved. As soon as a clear solution was obtained, the automatic pH control was activated, and the mixture was condensed further at a constant pH of 8.8 up to a turbidity point of 46° C. Subsequently, the pH was adjusted to 10.0 and the mixture was cooled to room temperature with stirring.

The resulting melamine resin had a solids content of 54% and a viscosity at 20° C. of 40 mPas and could be processed for about 5 weeks.

EXAMPLE 7

Comparative Example According to Ex. 4 of WO 97/07152

First of all, a melamine resin comprising 370 g of aqueous formaldehyde (40%), 320 g of water and 400 g of melamine was condensed at a constant pH of 8.8 and at 98° C. up to a turbidity point of 42° C. The product has a solids content of 49.8% and is stable on storage for about 4 weeks.

A mixture of 1 kg of water and 7.2 g of Avicel stirred at high shear for about 15 minutes beforehand is added to 1 kg of the above resin and the mixture is heated to 100° C. A pH of 8.2 is established. After about 2.5 h, turbidity appears; after 8 hours, the mixture is cooled.

The resulting mixture contains particles having a size of from 2 μm to 60 μm. The maximum is at 25 μm. The mixture has a viscosity of 140 mPas and a solids content of 23.5%.

Their low solids content alone makes these products unsuitable for use as impregnating resins. The resin add-on required can be obtained only by repeated impregnation and drying. Solids contents above 40% cannot be achieved with this process owing to the sharply increasing viscosity. Furthermore, experience shows that particle sizes above 20 μm result in inadequate surface qualities. They can at best be admixed in small amounts to standard commercial impregnating resins.

Impregnation

Decoration paper with a basis weight of 80 g/m² is preimpregnated with melamine impregnating resin KMT 787 liq. (BASF AG) (70% resin addon based on the paper weight). The test resins are knife coated onto the preimpregnated paper (black and white) and the resulting films are dried to a residual moisture content of 6–7%. The films are then placed on a standard commercial 19 mm chipboard panel and pressed in a coating press at 20 bar and 190° C. for 35 seconds.

Resin Characteristics

TABLE 1

|  | Example 3 | Example 4 | Comparative 5 | Comparative 6 |
|---|---|---|---|---|
| Solids content (2 h, 120° C.) | 52% | 44% | 43% | 54% |
| Viscosity (20° C.) | 80 mPas | 65 mPas | 60 mPas | 40 mPas |
| Average particle size (μm) | 0.8 μm | 0.7 μm | 0.9 μm | — |
| Glass transition temperature (° C.) | 50° C. | 65° C. | 110° C. | — |
| Energy content by DSC (J/g of solids) | 83 J/g | 75 J/g | 45 J/g | 160 J/g |

The results of the performance testing of the coated chipboard panels produced in this way are shown in Tables 2 and 3.

TABLE 2

| Resin | Comparative 2 | KMT 787liq. | Example 1 | Example 2 |
|---|---|---|---|---|
| Curing agent (H 529, BASF) | 0.35 | 0.35 | 0.35 | 0.35 |
| Resin addon at secondary impregnation stage | 55% | 55% | 55% | 55% |
| Resin addon, total | 125% | 125% | 125% | 125% |
| Curing | 3 | 3 | 1–2 | 1–2 |
| Gloss | 20 | 24 | 105 | 81 |
| Coherence | 3–4 | 3–4 | 1 | 1 |
| Cracks | 1 | 0 | 0 | 0 |
| Water vapor (loss of gloss) | 45% | 38% | 5% | 0% |
| Scratch resistance (N) | 1.4 | 1.4 | 1.6 | 1.6 |
| Yellowing | 3 | 3 | 3 | 3 |
| Blackness | 0.61 | 0.55 | 0.61 | 0.59 |

TABLE 3

| Resin | KMT 787liq. | Example 3 | Example 4 | Comparative 5 | Comparative 6 |
|---|---|---|---|---|---|
| Curing agent (H 529, BASF) | 0.32 | 0.3 | 0.3 | 0.3 | 0.3 |
| Resin addon at secondary impregnation stage | 42% | 45% | 47% | 44% | 43% |
| Resin addon total | 112% | 115% | 117% | 114 | 113% |
| Curing | 2 | 2 | 1–2 | 2–3 | 2–3 |
| Gloss | 20 | 84 | 86 | 69 | 21 |
| Coherence | 3–4 | 2 | 2 | 5 | 5–6 |
| Cracks | 0 | 0 | 0 | 0 | 0 |
| Blackness | 0.58 | 0.55 | 0.57 | 1.1–3 | 0.68 |

Specifications for the performance testing of the coated chipboard panels and the DSC measurements Yellowing In order to determine the degree of resistance of the resin to heat exposure the yellowing of the surface is determined using a heatable die under pressure. The die of the test instrument is pressed onto the test surface at 225° C. with a force of 5 N/mm². The degree of yellowing is rated on a scale from 0 to 6.
Assessment
0=no yellowing
1=very slight yellowing
2=visible discoloration
3=moderately severe discoloration
4=severe browning
5=very severe browning
6=dark brown area
Scratch Resistance The behavior of the surface under scratch stress is tested using a scratch test instrument from Erichsen in accordance with the method described in EN 438.
Curing The quality of cure is determined by allowing a 0.2 N hydrochloric acid stained with 0.004% by weight of Rhodamin B solution to act on the coated chipboard panel for 16 hours. If curing is good the surface is not attacked by the acid. The severity of attack can be assessed from the strength of the reddening.
Assessment
0=no attack
1=pale pink coloration
2=marked reddening
3=severe reddening
4=severe reddening with slight surface swelling
5=severe reddening with severe surface swelling
6=surface destroyed
Gloss The gloss is measured in accordance with DIN 67580 by measuring the reflectance of a beam of light at an incident angle of 20°. The higher the percentage of reflected light, the better the gloss.
Coherence The coherence, or porosity, of the coated chipboard surface is used to assess the propensity to soiling. Black shoe polish is rubbed into the test surface which is then cleaned again with a cloth. The shoe polish remaining in the pores permits an assessment to be made of the coherence of the surface.

The assessment of the surface coherence is made on the following scale:
0=pore-free
1=isolated pores
2=few pores
3=frequent pores
4=many open areas
5=very many open areas
6=no coherence.
Crack Resistance The crack resistance of a surface is determined in accordance with DIN 53799. The coated chipboard panel is stored in a forced-air drying cabinet at 70° C. for a period of 24 h. The drying process is accompanied by shrink stresses which lead to cracking in the surfaces. The test can be intensified by increasing the drying temperature or by drilling into the surface (notch effect). The cracking is assessed in accordance with the following scale:
0=no cracks
1=isolated small cracks
2=few cracks
3=moderate cracking
4=frequent cracks
5=many cracks
6=total cracking.
Blackness The blackness is measured in accordance with D 3265 using a tint tester 527 with a tint sensor lightness measuring head. The measurement range covers 0–99.99 lightness units, zero being the lowest lightness level (absolutely black). Distinct graying is perceptible already at levels >0.8.

Following calibration of the instrument with a standard, the test specimen is measured three times and the mean value is reported as the blackness.
DSC measurements DSC (Differential Scanning Calorimetry) measurements were conducted using a DSC 912+TA2000 from TA Instruments. High-pressure steel crucibles with gold-plated copper seals (maximum pressure 150 bar, mass approx. 630 mg) from Perkin Elmer were used. The sample weight was typically 20–25 mg. The DSC instrument was temperature-calibrated using water and tin; for the enthalpy calibration, indium was used. The sample was introduced at room temperature, then cooled initially to −20° C., after which the first heating run was carried out with a heating rate of 10 K/min up to 250° C. The DSC plots show first of all a glass transition at low temperatures followed by a pronounced exothermic peak thermal flux. The glass transition temperature was evaluated as the midpoint glass transition temperature in accordance with DIN 53765. The reaction enthalpy of the exothermic peak was determined, using a linear baseline, by integrating the total area between the DSC plot and the baseline. From this reaction enthalpy, the enthalpy related to the known solids fraction was calculated. In addition, a determination was made of the temperature $T_R^{max}$ of the exothermic peak at which the maximum thermal flux occurs, and also its extrapolated onset temperature.

We claim:

1. An aqueous melamine resin dispersion comprising as discontinuous phase a melamine resin stabilized by a combination of a cationic protective colloid and an anionic protective colloid.

2. An aqueous melamine resin dispersion as claimed in claim 1, wherein the melamine resin comprises
   a) melamine
   b) from 1.3 to 3.0 mol of formaldehyde per mole of melamine
   c) optionally, up to 0.5 mol of urea per mole of melamine
   d) optionally, from 0.01 to 0.3 mol of another compound capable of reacting with formaldehyde in a polycondensation reaction, per mole of melamine, and
   e) optionally, from 1 to 50% by weight, based on the melamine, of an elasticizer.

3. An aqueous melamine resin dispersion as claimed in claim 1 or 2, wherein the anionic and the cationic protective colloid are used in an overall amount of from 0.02 to 6% by weight, based on the overall amount of melamine and formaldehyde.

4. An aqueous melamine resin dispersion as claimed in claim 1, wherein the weight ratio of anionic to cationic protective colloid is from 0.02:1 to 50:1.

5. An aqueous melamine resin dispersion as claimed in claim 1, wherein said cationic protective colloid comprises cationic starch.

6. An aqueous melamine resin dispersion as claimed in claim 1, wherein said anionic protective colloid comprises a copolymer of acrylic acid, methyl acrylate and 2-acrylamido-2-methylpropanesulfonic acid.

7. An aqueous melamine dispersion as claimed in claim 1, wherein the melamine resin has a glass transition temperature of from 0 to 80° C. and an energy content of from 20 to 160 J/g (calculated on the basis of a 100% dispersion).

8. An aqueous melamine resin dispersion as claimed in claim 1, wherein the melamine resin is in the form of particles having an average size of from 0.05 to 30 μm.

9. An aqueous melamine resin dispersion as claimed in claim 8, wherein the half-value width of the melamine resin particles is from 10% to 180% of the average particle size.

10. An aqueous melamine resin dispersion as claimed in claim 1, wherein said elasticizer is present.

11. An aqueous melamine resin dispersion as claimed in claim 10, wherein said elasticizer comprises at least one of monohydric and polyhydric alcohols, amino alcohols, amides and lactams, ethanolamides, the abovementioned elasticizers in ethoxylated form, 2-(5-hydroxy-3-oxapentylamine)-1,3,5-triazine,
2,4-di(5-hydroxy-3-oxapentylamine)-1,3,5-triazine,
2,4,6-tris(5-hydroxy-3-oxapentylamine)-1,3,5-triazine and ethoxylated melamine.

12. A process for preparing the melamine resin dispersion as claimed in claim 2, which comprises
  1) in step 1, first preparing an aqueous solution of a melamine resin from components a) to d) in the presence or absence of the anionic and of the cationic protective colloid and continuing reaction at a pH of from 7 to 10 and at a temperature of from 50 to 140° C. until cloudiness begins, the anionic and cationic protective colloids being added no later than at the onset of clouding; and
  2) further reacting the melamine resin solution prepared in accordance with step 1 at a pH of from 7 to 10 and at a temperature of from 50 to 140° C. until it has undergone transition to a dispersion.

13. A process as claimed in claim 12, wherein the elasticizer is added to the reaction mixture or to the melamine resin at any desired point in time.

14. A formulation comprising
  an aqueous dispersion as claimed in claim 1
  optionally, from 1 to 200% by weight, based on the overall amount of formaldehyde and melamine in the form of the melamine resin, of an uncured melamine resin and/or urea resin in dissolved form
  optionally, a thickener or thixotropic agent.

15. A process for producing a sheet, which comprises
  coating a decoration paper, which optionally has been preimpregnated with a melamine resin or urea resin, with the formulation as claimed in claim 14; and
  drying the coated and, optionally, prepared decoration paper.

16. A sheet produced as claimed in claim 15.

17. A method of coating a woodbase material, which comprises applying a sheet as claimed in claim 16 to the surface of the woodbase material by adhesive bonding or by pressing with the use of pressure or temperature.

18. A coated woodbase material obtainable as claimed in claim 17.

* * * * *